United States Patent
Matsuda et al.

[11] Patent Number: 5,515,095
[45] Date of Patent: May 7, 1996

[54] ELECTROSTATIC RECORDING HEAD WITH A PLURALITY OF LINEAR ELECTRODE ARRAYS AND A METHOD OF DRIVING THE SAME

[75] Inventors: Naoya Matsuda; Tetsuo Itagaki, both of Tokyo, Japan

[73] Assignee: Nippon Steel Corporation, Tokyo, Japan

[21] Appl. No.: 254,104

[22] Filed: Jun. 6, 1994

[30] Foreign Application Priority Data

Jun. 8, 1993 [JP] Japan .................. 5-164015

[51] Int. Cl.⁶ .................................. G01D 15/06
[52] U.S. Cl. .................................. 347/145
[58] Field of Search .......................... 347/145

[56] References Cited

U.S. PATENT DOCUMENTS

| | | | |
|---|---|---|---|
| 4,157,533 | 6/1979 | Diddens | 347/145 |
| 4,258,373 | 3/1981 | Arnoldi et al. | 347/145 |
| 5,053,793 | 10/1991 | White et al. | 347/145 |

FOREIGN PATENT DOCUMENTS 3-197987  8/1991  Japan .

*Primary Examiner*—Peter S. Wong
*Assistant Examiner*—Randy W. Gibson
*Attorney, Agent, or Firm*—Pollock, Vande Sande & Priddy

[57] ABSTRACT

An electrostatic recording head used for forming an electrostatic latent image of an image to be recorded on a recording medium comprises a plurality of electrode groups, each group including a plurality of needle-like electrodes. The needle-like electrodes of all the groups are arranged linearly in at least one line. A plurality of auxiliary electrodes are disposed such that each of the electrode groups faces at least one of the auxiliary electrodes. An auxiliary electrode driving unit drives the auxiliary electrodes independently of each other. Each of the electrode groups is divided into a plurality of subgroups, each subgroup including at least one of the needle-like electrodes. A subgroup driving unit is provided for each of the subgroups for driving the subgroups independently of each other. A control circuit controls the subgroup driving unit and the auxiliary electrode driving unit so that the subgroups belonging to one of the electrode groups are driven in such an order that a plurality of subgroups which are not adjacent to each other are simultaneously driven, while at least one of the auxiliary electrodes facing the one electrode group is driven during at least a time interval when any one of the subgroups is driven.

8 Claims, 8 Drawing Sheets

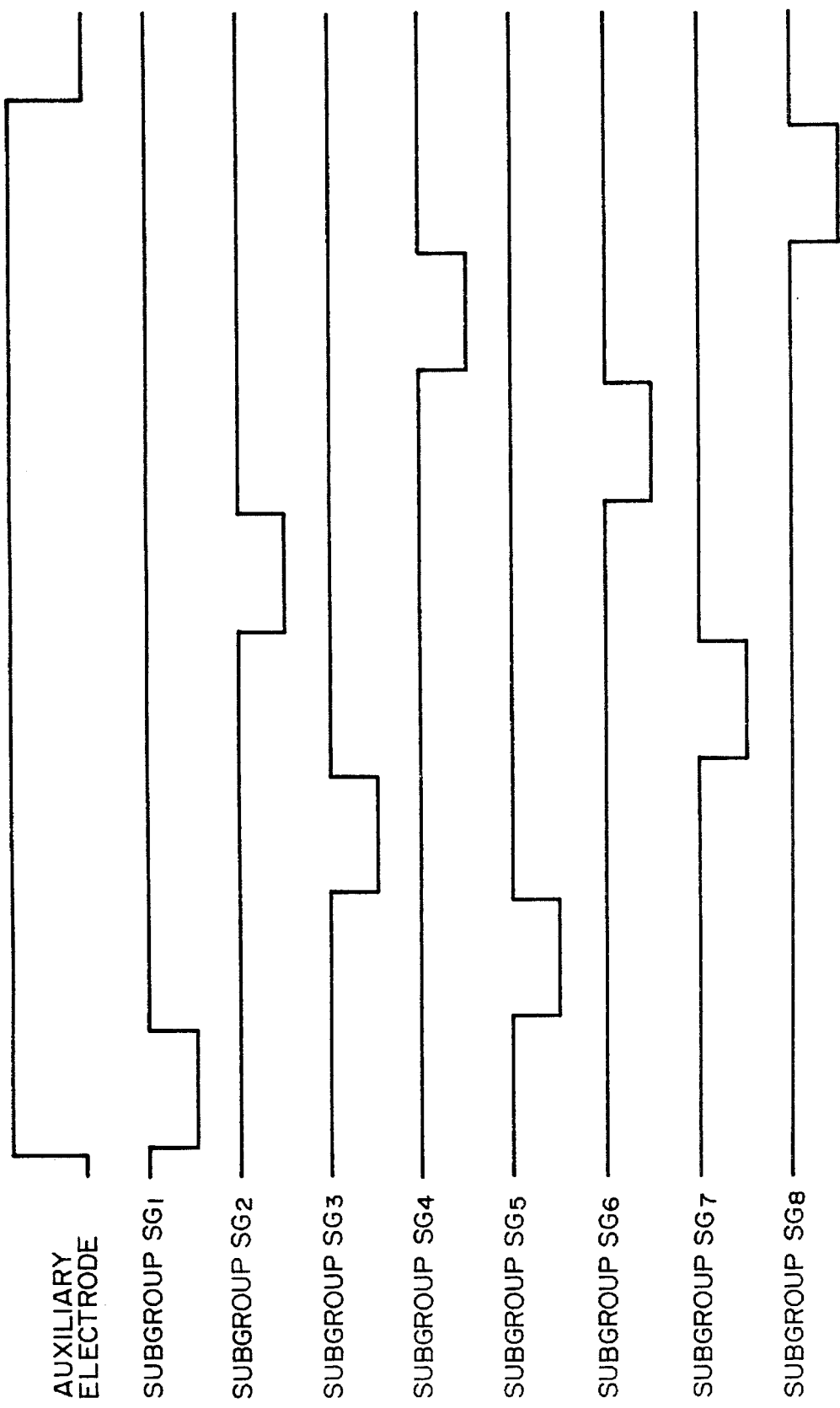

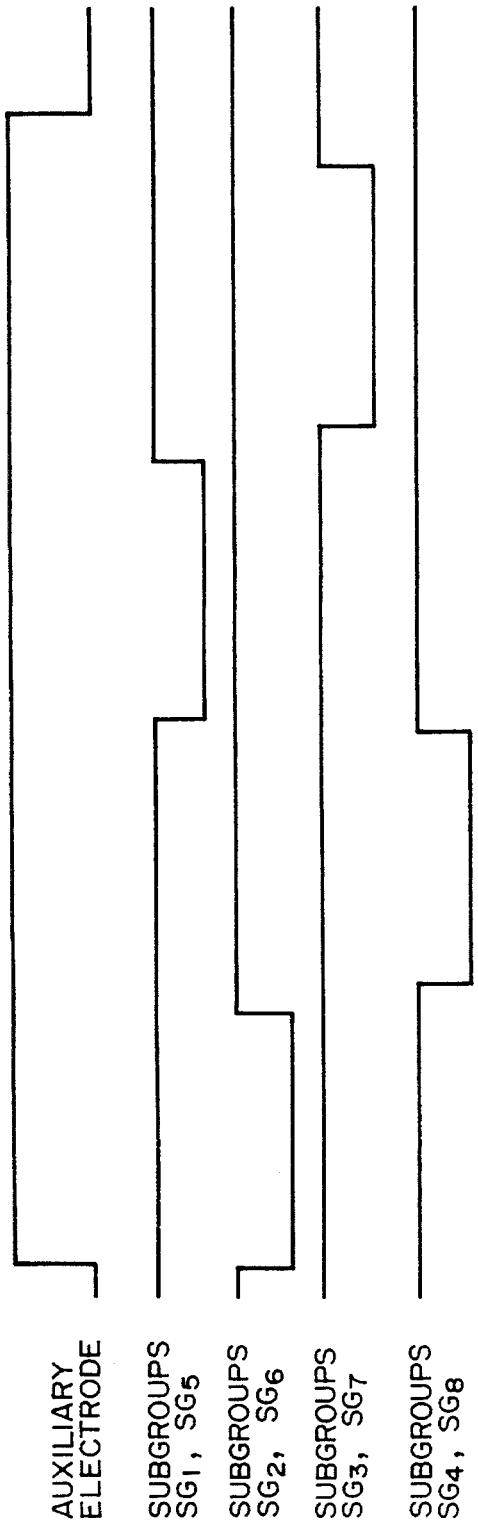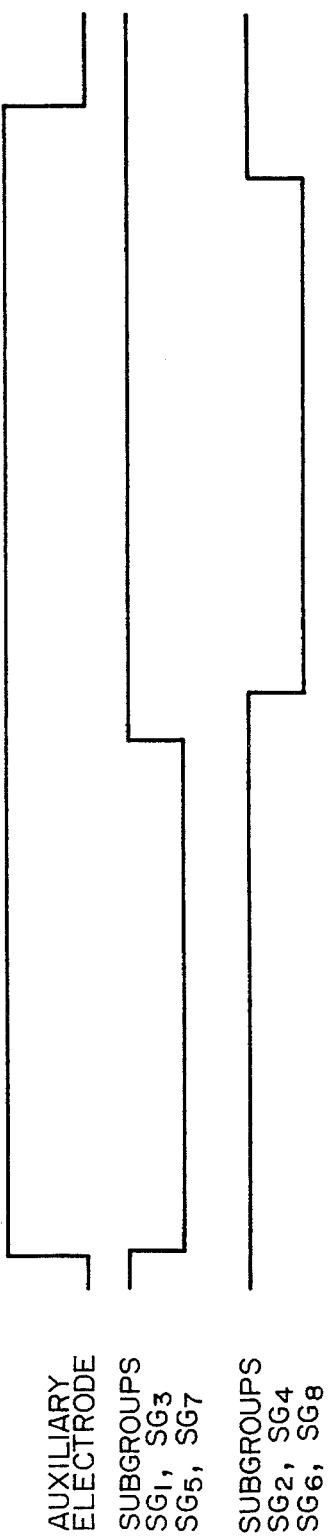

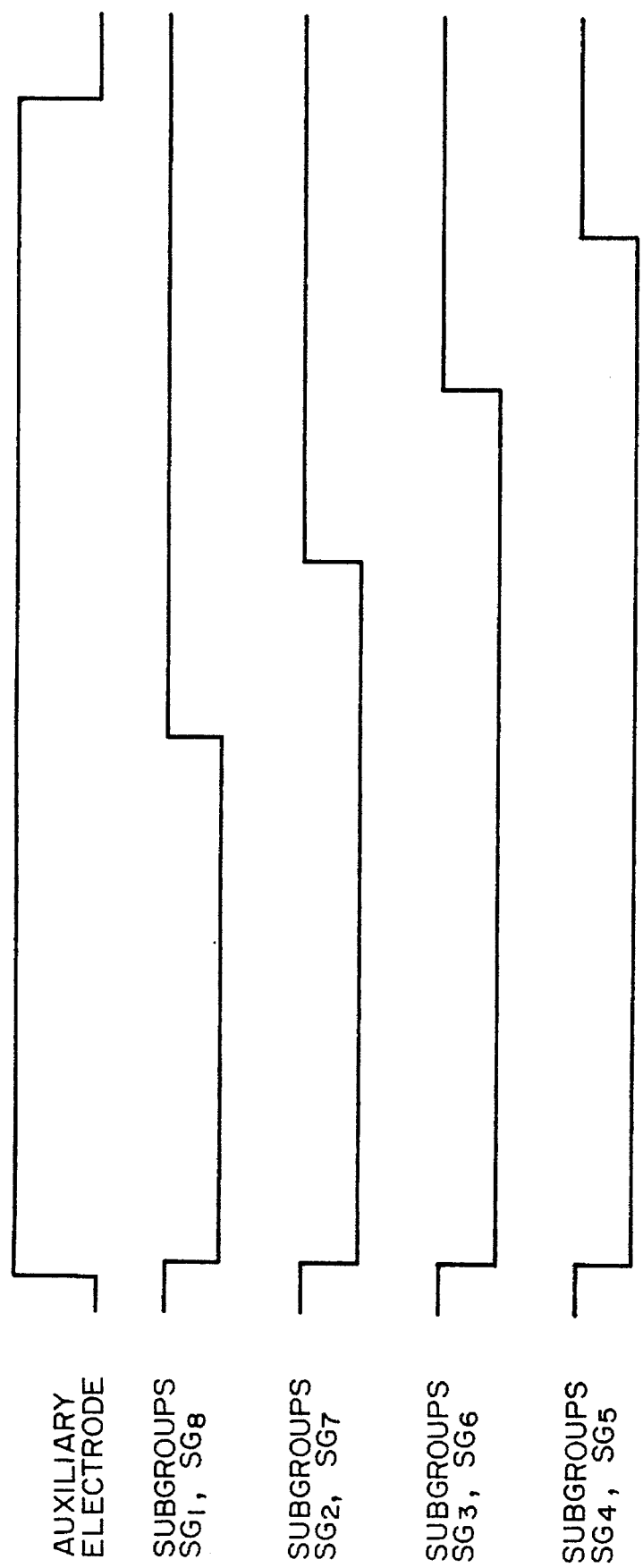

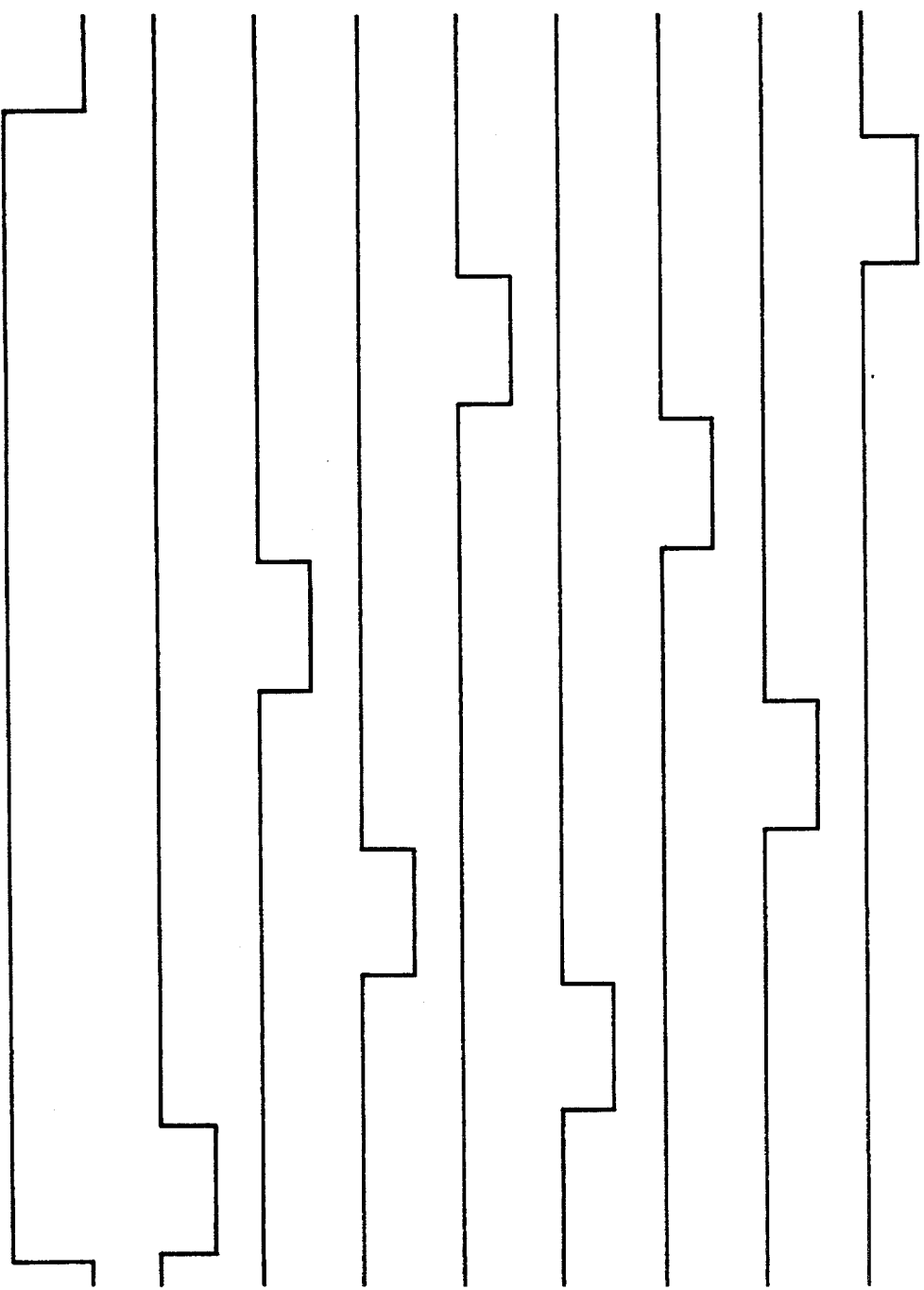

ELECTROSTATIC RECORDING HEAD WITH A PLURALITY OF LINEAR ELECTRODE ARRAYS AND A METHOD OF DRIVING THE SAME

BACKGROUND OF THE INVENTION

1. Field of the Invention

This invention relates to an electrostatic recording head used in an electrostatic recording apparatus, such as, an electrostatic plotter and also to a method of driving the same.

2. Description of the Related Art

A prior art electrostatic recording head includes a multiplicity of recording electrodes, for example, needle-like electrodes linearly arranged in one or two lines in a direction substantially perpendicular to the direction of feeding a recording medium, and a plurality of auxiliary electrodes disposed in the vicinity of the needle-like electrodes. The needle-like electrodes are divided into a plurality of groups, and the plurality of auxiliary electrodes are disposed such that the needle-like electrodes belonging to each group are located to face one or two auxiliary electrodes. The term "face" used herein is intended to include the case where both the recording electrode and the auxiliary electrode are located opposite to each other on the side of the recording surface of the recording medium or the case where these electrodes are located opposite to each other on both sides of the recording medium, respectively.

A method using this electrostatic recording head for forming an electrostatic latent image of an image to be recorded on a recording medium is well known and will now be briefly described. The image to be recorded is scanned with lines one by one to generate a binary printing signal of a high level or a low level according to the brightness of each of the picture elements on one scanning line of the image being scanned. The needle-like electrodes of the electrostatic recording head are provided in the number corresponding to the number of the picture elements on one scanning line of the image. A predetermined voltage of, for example, −300 V is applied to the needle-like electrode in each group when the printing signal generated from the corresponding picture element is at the high level, and at the same time, another predetermined voltage of, for example, +300 V is applied to the auxiliary electrode facing that needle-like electrode. As a result, discharge occurs between the needle-like electrode and the auxiliary electrode through the recording medium, and an electrostatic latent image corresponding to the printing signal is formed on the recording medium. On the other hand, when the printing signal is at the low level, the above voltages are not applied to the needle-like electrode and the auxiliary electrode, and no discharge occurs between them, with the result that no electrostatic latent image is formed. In this manner, the predetermined voltage is selectively applied to each of the needle-like electrodes belonging to one group according to the level of the corresponding printing signal. Similar processing is successively executed for the electrodes of all the groups until the electrostatic latent image of the part of the image corresponding to one scanning line is formed. By the repetition of the above manner of processing in which the image is scanned with lines one by one while feeding the recording medium in a predetermined direction, the electrostatic latent image of the image is formed on the recording medium. The brightness of the image is determined by the density of the printing signals of the high level. Such an electrostatic recording head is disclosed in, for example, JP-A-3-197987, copending U.S. patent application Ser. No. 08/021,559, filed on Feb. 24, 1993 entitled "AN ELECTRODE DRIVING DEVICE IN ELECTROSTATIC RECORDING APPARATUS". The recording medium commonly includes a laminate of a base layer of an electrical insulating material, such as, paper or plastics, a layer of an electrical conductive material and a layer of a dielectric material.

In the case of the electrostatic recording head of the above type, it is known that striations corresponding to the respective groups of the needle-like electrodes appear in parallel to the direction of feeding the recording medium when an image, for example, a totally black image is to be formed. This is attributable to various causes. One cause is that, the application of the voltage to the auxiliary electrode induces polarization in the dielectric layer of the recording medium, and when the voltage is applied to the auxiliary electrode again before the polarization is released, this leads to a non-uniform spatial distribution of the electric field. According to another cause, a large capacity is induced at either end of each group of the needle-like electrodes due to the fact that the needle-like electrodes are closely arranged in each group. Still another cause is that, when the voltage is applied to almost all the needle-like electrodes belonging to the group, the spatial distribution of the electric field tends to become quite non-uniform at either end of the group due to the edge effect.

Therefore, various methods of driving the electrostatic recording head are proposed. For example, in one of the head driving methods, the discharge order is so selected that, after one group effects the discharge, another group on the head remote as far as possible from the one group is selected as the next one that effects the discharge, or the individual groups are successively driven to effect the discharge according to such a discharge order that the time interval between the discharge of one group and the next discharge of the group adjacent to the one group is made as long as possible. In another head driving method, the boundary between the groups is changed each time an electrostatic latent image representing one line of an image is formed. However, undesirable striations tend to appear on a recording medium due to another cause although the adverse effect of the polarization induced in the dielectric layer of the recording medium can be eliminated by the former method. Also in the case of the latter method, appearance of undesirable striations cannot be so effectively minimized. Therefore, in the case of the prior art electrostatic recording head of the multiplex type, it is very important to minimize appearance of such undesirable striations.

U.S. patent application Ser. No. 08/021,559 cited above proposes a method of solving such a prior art problem as pointed out above. This U.S. patent application is incorporated herein by reference.

SUMMARY OF THE INVENTION

It is an object of the present invention to provide an electrostatic recording head that can minimize appearance of undesirable striations in a nearly totally black image formed on a recording medium and also to provide a method of driving the same.

An electrostatic recording head used for forming an electrostatic latent image of an image to be recorded on a recording medium comprises a plurality of electrode groups, each group including a plurality of needle-like electrodes, the needle-like electrodes of all the groups being arranged linearly in at least one line. A plurality of auxiliary electrodes are disposed such that each of the electrode groups faces at least one of the auxiliary electrodes and auxiliary electrode driving means are provided for driving the plurality of auxiliary electrodes independently of each other. Subgroup driving means is provided for each of subgroups, into which each of the plurality of electrode groups is divided, and capable of driving the subgroups independently of each other and control means for controlling the subgroup driving means and the auxiliary electrode driving means so that the subgroups belonging to one of the electrode groups are driven in a predetermined order, while at least one of the auxiliary electrodes facing the one electrode group is driven during at least a time interval when any one of the subgroups is driven, thereby generating an electrostatic latent image representing one line of an image to be recorded on a recording medium.

The present invention also provides a method of driving an electrostatic recording head including a plurality of needle-like electrodes which comprises the steps of: dividing the plurality of needle-like electrodes into a plurality of electrode groups, disposing at least one auxiliary electrode facing each of the plurality of electrode groups, dividing each electrode group into a plurality of subgroups, and successively driving the plurality of subgroups belonging to one electrode group in a predetermined order while driving the at least one auxiliary electrode facing the one electrode group.

In the electrostatic recording head of the present invention having the above structure, the number of the needle-like electrodes simultaneously driven is decreased by controlling the needle-like electrode driving means and the auxiliary electrode driving means so as to drive the subgroups of the needle-like electrodes in one group in a predetermined order and to drive the auxiliary electrode corresponding to that group. Thus, the difference between the intensity of the electric field produced by the needle-like electrodes at the middle part of the subgroup and that produced at the peripheral part of the subgroup can be made smaller than the difference of the intensity of the electric field in the prior art which is produced between the middle part of the electrode group and the peripheral part of the electrode group when driving one group of the needle-like electrodes at a time. As a result, many striations corresponding to the subgroups tend to appear closely on the recording medium. However, the degree in contrast of the striations appearing on the recording medium can be reduced as compared to the case of the prior art electrostatic recording head in which the needle-like electrodes are driven with one group. Therefore, the undesirable striations tending to appear on the recording medium at areas corresponding to the middle part and the peripheral part of each electrode group can be made substantially inconspicuous to the eye.

In the method of driving the electrostatic recording head according to the present invention, the number of the needle-like electrodes simultaneously driven is decreased because the operation for driving the subgroups of the needle-like electrodes in one group in sequence in the predetermined order and driving the auxiliary electrodes corresponding to the one group is carried out for each of the groups. Thus, the difference between the intensity of the electric field produced by the needle-like electrodes at the middle part of the subgroup and that produced at the peripheral part thereof can be made smaller than the difference of the intensity of the electric field in the prior art which is produced between the middle part of the group and that of the electric field produced by the needle-like electrodes at the peripheral part of the group due to driving one group of the needle-like electrodes at a time. As a result, many striations corresponding to the subgroups tend to appear closely on the recording medium. However, as compared to the prior art head where one group of the needle-like electrodes is driven at a time, the degree in contrast of the striations appearing on the recording medium can be reduced. Therefore, the undesirable striations tending to appear on the recording medium at areas corresponding to the middle part and the peripheral part of each group can be made substantially inconspicuous to the eye.

BRIEF DESCRIPTION OF THE DRAWINGS

FIG. 4 is a timing chart showing the timing of driving the needle-like electrodes according to a first embodiment of the driving method of the present invention.

FIG. 6 is a timing chart showing the timing of driving the needle-like electrodes according to a second embodiment of the driving method of the present invention.

FIG. 7 is a timing chart showing the driving timing in a modification of the second embodiment of the driving method of the present invention.

FIG. 8 is a timing chart showing the timing of driving the needle-like electrodes according to a third embodiment of the driving method of the present invention, and FIG. 9 is a timing chart showing the timing of driving the needle-like electrodes according to a fourth embodiment of the driving method of the present invention.

DESCRIPTION OF THE PREFERRED EMBODIMENTS

A first embodiment of the electrostatic recording head of the present invention and a method of driving the same will be described by reference to the drawings.

Figure 1:
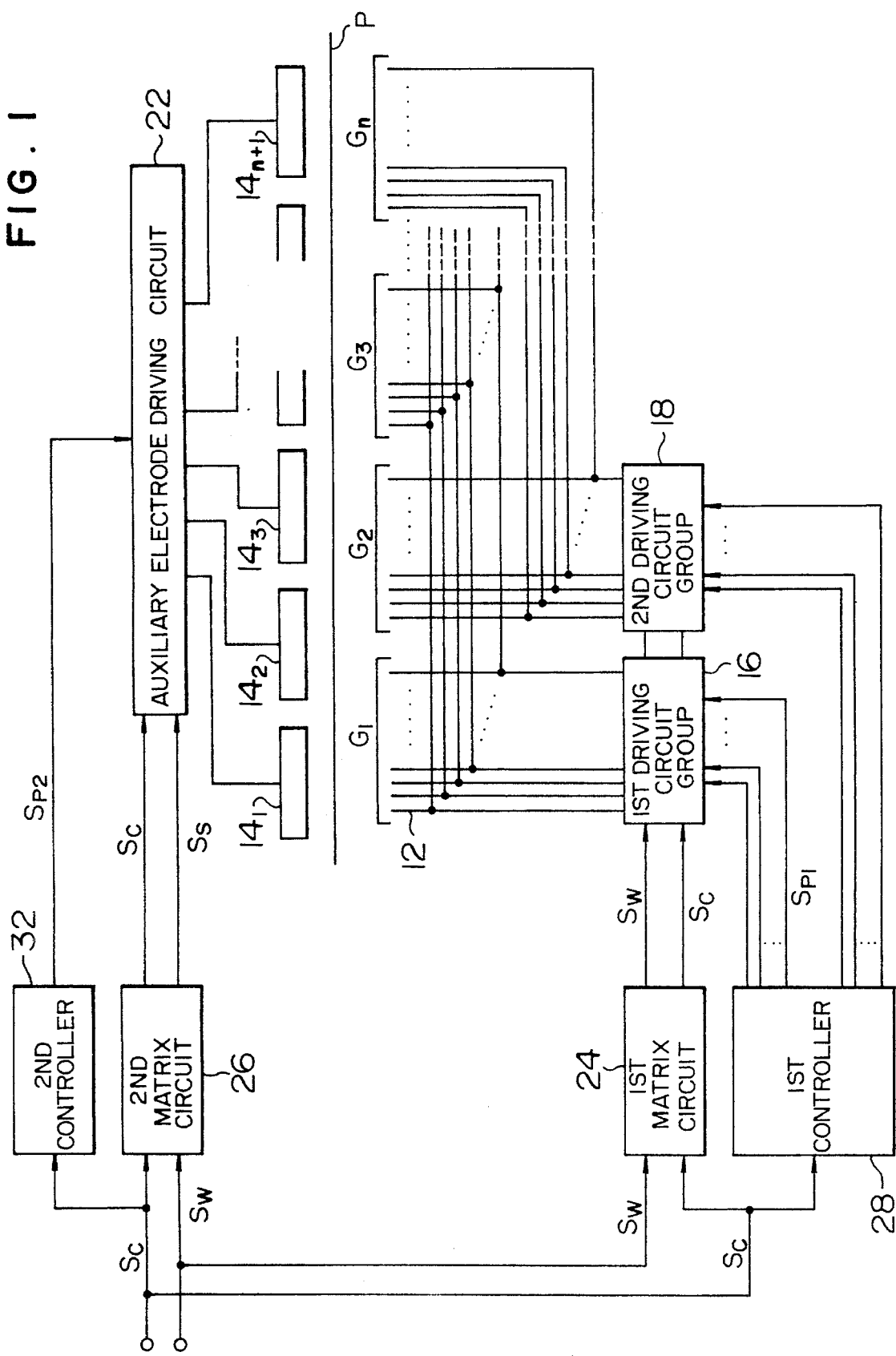
FIG. 1 schematically shows the structure of an embodiment of the electrostatic recording head according to the present invention.

The embodiment of the eletrostatic recording head shown in FIG. 1 comprises a multiplicity of needle-like electrodes 12, a plurality of plate-formed auxiliary electrodes 141, 142, ..., 14n-1 (n : an even number), a first group driving circuit group 16 and a second driving circuit group 18 functioning as needle-like electrode driving means, an auxiliary electrode driving circuit 22, a first matrix circuit 24, a second matrix circuit 26, and a first controller 28 and a second controller 32 functioning as control means.

The needle-like electrodes 12 are arranged in a direction substantially perpendicular to a direction of feeding a recording sheet P (a direction perpendicular to the surface of the drawing sheet in FIG. 1), and the plural auxiliary electrodes 141, 142, . . . , 14n-1 are disposed on the other side of the recording sheet P remote from the side where the needle-like electrodes 12 are disposed. The many needle-like electrodes 12 are divided into a plurality of groups G1, G2, . . . , Gn each of which includes 64 needle-like electrodes 12. The needle-like electrode groups G1, G2, . . . , Gn and the associated auxiliary electrodes 141, 142, . . . , 14n-1 are displaced by a half of the length thereof relative to each other as shown. That is, each of the auxiliary electrodes 142, 143, . . . , 14n except those located at the both ends is disposed to face two needle-like electrode groups. For example, the auxiliary electrode 142 is disposed to face the needle-like electrode groups G1 and G2, while the auxiliary electrode 143 is disposed to face the needle-like electrode groups G2 and G3. The needle-like electrodes 12 in the even-numbered groups are connected in the form of a matrix, and those in the odd-numbered groups are also connected in the form of a matrix. That is, when the needle-like electrodes 12 in each of the odd-numbered groups are numbered in the arranged order, the needle-like electrodes having the same number in the individual groups are connected by a common lead to the first controller 16. Similarly, the needle-like electrodes 12 having the same number in the individual even-numbered groups are connected through a common lead to the second controller 18.

Figure 2:
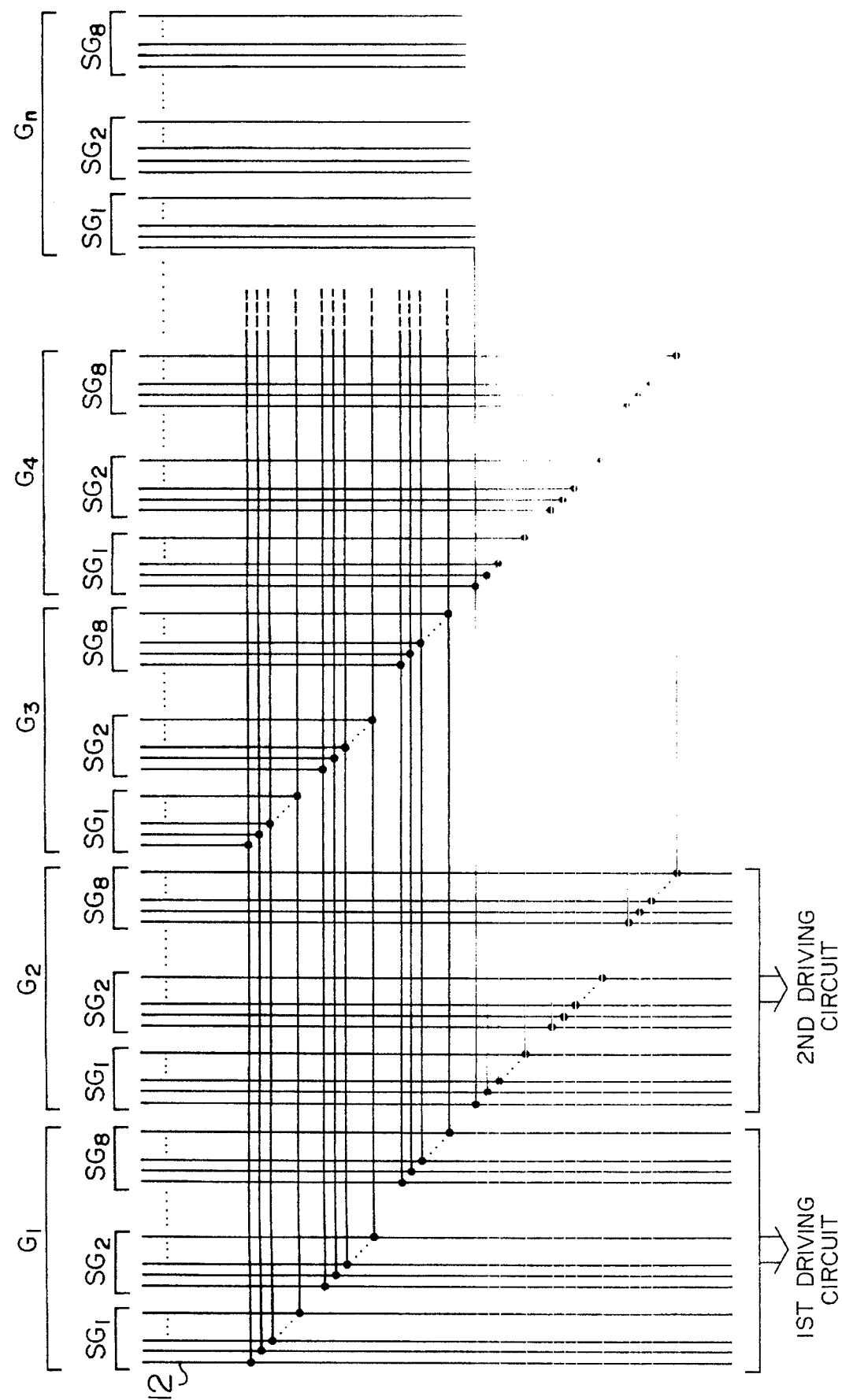
FIG. 2 schematically shows the arrangement of part of the needle-like electrodes in the electrostatic recording head shown in FIG. 1.

Also, as shown in FIG. 2, each of the needle-like electrode groups G1, G2, . . . , Gn is divided into eight subgroups SG1, SG2, . . . , SG8 each of which includes eight needle-like electrodes 12.

Figure 3:
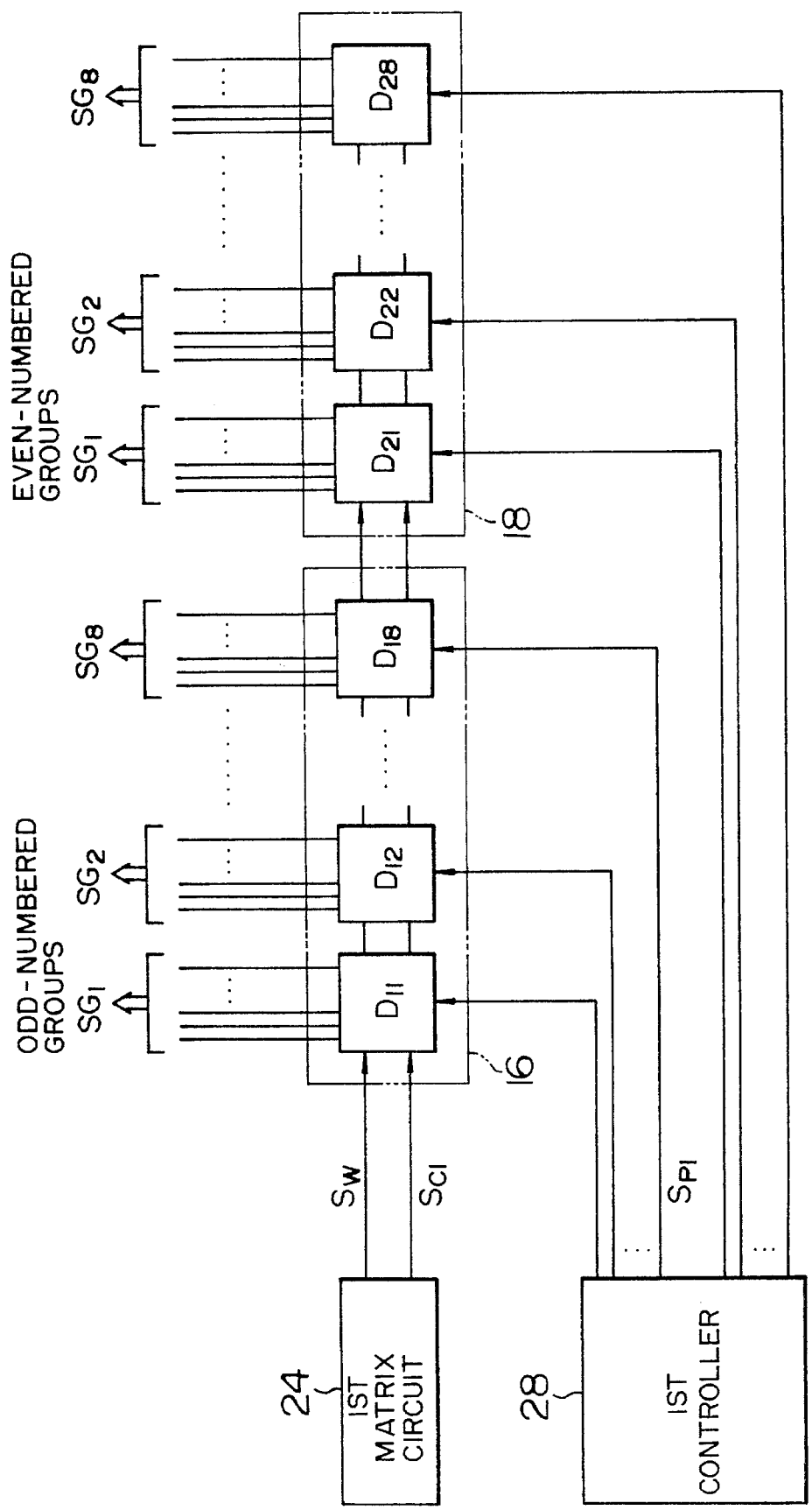
FIG. 3 shows the arrangement of the first and second driving circuit groups in the electrostatic recording head shown in FIG. 1.

As shown in FIG. 3, the first driving circuit group 16 and the second driving circuit group 18 are each divided into eight driving circuits D1$k$ and D2$k$ ($k$=1, 2, . . . , 8) correspondingly to the associated subgroups SG$k$ ($k$=1, 2, . . . , 8) belonging to each group, respectively. The needle-like electrodes 12 included in the subgroups SG$k$ ($k$=1, 2, . . . , 8) belonging to the odd-numbered groups G1, G3, . . . are connected to the driving circuits D1$k$ ($k$=1, 2, . . . , 8) in the first driving circuit group 16, while the needle-like electrodes 12 included in the subgroups SG$k$ ($k$=1, 2, . . . , 8) belonging to the even-numbered groups G2, G4, . . . are connected to the driving circuits D2$k$ ($k$=1, 2, . . . , 8) in the second driving circuit group 18.

The auxiliary electrodes 141, 142, . . . , 14n-1 are connected to the auxiliary electrode driving circuit 22. The first driving circuit group 16 and the second driving circuit group 18 apply a voltage V1 (for example, −300 V) to the needle-like electrodes 12, and the auxiliary electrode driving circuit 22 applies to the auxiliary electrodes 141, 142, . . . , 14n-1 a voltage V2 (for example, +300 V) of the polarity opposite to that applied to the needle-like electrodes 12. The auxiliary electrode 141, 142, . . . , 14n-1 supplies a shortage of the voltage applied to the needle-like electrode 12 from a discharge starting voltage. The discharge is started when the necessary voltages are applied to both the needle-like electrode 12 and the corresponding auxiliary electrode 14.

As in the case of the prior art electrostatic recording head, an image to be recorded is scanned to obtain a series of binary printing signals representing the brightness of respective picture elements included in one scanning line of the image as scanned. Those of the printing signals corresponding to the needle-like electrodes 12 of the selected group are selected by means not shown to be supplied as a series of printing signals Sw to each of the first matrix circuit 24 and the second matrix circuit 26. As described already, the printing signal Sw is a binary signal that determines whether or not the voltage is to be applied to each needle-like electrode 12, and whether or not the voltage is to be applied to the needle-like electrode 12 corresponding to each of the individual picture elements constituting one line of the image is determined by the printing signal obtained from that picture element. A clock generator circuit not shown supplies a clock signal Sc to each of the first matrix circuit 24, the second matrix circuit 26, the first controller 28 and the second controller 32.

The printing signals Sw from the first matrix circuit 24 and the clock signal Sc from the clock generator circuit are supplied to the first and second driving circuit groups 16 and 18, and the first and second driving circuit groups 16 and 18 fetch the printing signals Sw at the timings determined by the clock signal Sc. The data regarding predetermined timings of driving the individual needle-like electrodes 12 in each of the groups are stored in or externally supplied to the first controller 28. In response to the clock signal Sc supplied to the first controller 28, the first controller 28 produces printing pulse signals Sp1 used for controlling the timings of driving the individual needle-like electrodes 12 in each of the groups. The timings of driving the needle-like electrodes 12 in each of the groups are one of the most important features of the present invention and will be described in detail later. Therefore, on the basis of the fetched printing signals Sw, the first driving circuit group 16 determines whether or not the voltage is to be applied to the individual needle-like electrodes 12 included in the odd-numbered group, for example, the group G1, and, when the needle-like electrodes 12 to which the voltage is to be applied are determined, the predetermined voltage V1 of, for example, −300 V is applied from an external power source at the timings determined by the printing pulse signals Sp1. Similarly, based on the fetched printing signals Sw, the second driving circuit group 18 determines whether or not the voltage is to be applied to the individual needle-like electrodes 12 included in the even-numbered group, for example, the group G2, and, when the needle-like electrodes 12 to which the voltage is to be applied are determined, the predetermined voltage V1 of, for example, −300 V is applied from the external power source at the timings determined by the printing pulse signals Sp1.

On the other hand, on the basis of the fetched printing signals Sw, the second matrix circuit 26 generates a selecting signal Ss for selecting the two auxiliary electrodes 14 corresponding to the group to which the needle-like electrodes 12 driven by the first or second driving circuit group 16 or 18 belong, and this selecting signal Ss is supplied together with the clock signal Sc to the auxiliary electrode driving circuit 22. The auxiliary electrode driving circuit 22 fetches this selecting signal Ss at the timing of the clock signal Sc. In response to the supplied clock signal Sc, the second controller 32 generates a printing pulse signal Sp2 determining the timing of driving the two auxiliary electrodes 14 corresponding to the group to which the needle-like electrodes 12 driven by the first controller 28 belong, and this printing pulse signal Sp2 is supplied to the auxiliary electrode driving circuit 22.

How to control the timings of driving the needle-like electrodes 12 in the individual groups will now be described.

The first controller 28 applies the printing pulse signals Sp1 for driving either the driving circuits D1$k$ ($k$=1, 2, . . . , 8) in the first driving circuit group 16 or the driving circuits D2$k$ ($k$=1, 2, . . . , 8) in the second driving circuit group 18 connected to the needle-like electrodes 12 included in the subgroups in the selected group, and the printing pulse signals Sp1 are supplied to the first driving circuit group 16 or the second driving circuit group 18. The printing pulse signals Sp1 determine the timings of driving the driving circuits D1$k$ ($k$=1, 2, ..., 8) in the first driving circuit group 16 or the driving circuits D2$k$ ($k$=1, 2, ..., 8) in the second driving circuit group 18. Also, by controlling the pulse widths of the printing pulse signals Sp1, the driving durations for these driving circuits D$ik$ and D2$k$ ($k$=1, 2, ..., 8) are controlled. Also, the clock signal Sc is supplied to the first controller 28. This clock signal Sc determines the timings of generating the printing pulse signals Sp1 from the first controller 28.

The second controller 32 generates the printing pulse signal Sp2 for driving the two auxiliary electrodes 14 corresponding to a predetermined group, and this printing pulse signal Sp2 is supplied to the auxiliary electrode driving circuit 22. This printing pulse signal Sp2 determines the timing of driving the auxiliary electrode driving circuit 22. Also, by controlling the pulse width of the printing pulse signal Sp2, the duration of driving the auxiliary electrode driving circuit 22 is controlled. The clock signal Sc is supplied to the second controller 32, and this clock signal Sc determines the timing of generating the printing pulse signal Sp2 from the second controller 32.

The first controller 28 and the second controller 32 control the first driving circuit group 16, the second driving circuit group 18 and the auxiliary electrode driving circuit 22, so that the operation for sequentially driving the subgroups of the needle-like electrodes 12 in each group in a predetermined order and driving the auxiliary electrodes 14 corresponding to that group is successively applied to the respective groups. Herein, the discharge order of the individual groups is so determined that, first, for example, the odd-numbered groups G1, G3, ... are operated successively starting from the group having the smallest number and then the even-numbered groups G2, G4, ... are operated successively starting from the group having the smallest number.

Also, the discharge order of the subgroups is so set that no more than one subgroups operates at the same time, and the adjacent two subgroups do not consecutively operate. More concretely, as shown in FIG. 4, the discharge timing of the subgroups is so determined that the subgroup SG1 operates first for the discharge in one group, the subgroup SG5 operates secondly for the discharge, the subgroup SG3 operates thirdly for the discharge, the subgroup SG7 operates fourthly for the discharge, the subgroup SG2 operates fifthly for the discharge, the subgroup SG6 operates sixthly for the discharge, the subgroup SG4 operates seventhly for the discharge, and the subgroup SG8 operates finally for the discharge. In the first embodiment of the driving method of the present invention, the durations of driving the needle-like electrodes 12 in the respective subgroups are selected to be equal to each other. That is, the pulse widths of the printing pulse signals Sp1 supplied from the first controller 28 to the individual driving circuits D1$k$ or D2$k$ ($k$=1, 2, ..., 8) in the first driving circuit group 16 or the second driving circuit group 18 are set to constant.

The operation of driving the electrostatic recording head according to the first embodiment of the present invention method will now be described.

In the printing process on a recording sheet, the first matrix circuit 24 supplies first the printing signals Sw to both the first driving circuit group 16 and the second driving circuit group 18, and the first driving circuit group 16 and the second driving circuit group 18 fetch the printing signals Sw at predetermined timings. Since the needle-like electrodes 12 belonging to the subgroup SG1 in the first group G1 are to be driven first, the printing pulse signals Sp1 for driving the driving circuit D11 in the first driving circuit group 16 connected to the needle-like electrodes 12 included in the subgroup SG1 in the odd-numbered group are supplied from the first controller 28 to the driving circuit D11 in the first driving circuit group 16.

On the other hand, the selecting signal Ss for selecting the two auxiliary electrodes 141 and 142 corresponding to the group G1 is supplied from the second matrix circuit 26 to the auxiliary electrode driving circuit 22, and the auxiliary electrode driving circuit 22 fetches the selecting signal Ss at a predetermined timing. Then, when the second controller 32 supplies the printing pulse signal Sp2 to the auxiliary electrode driving circuit 22, the two auxiliary electrodes 141 and 142 are driven according to the selecting signal Ss. Thus, the voltage corresponding to the printing signal Sw is selectively applied to each of the needle-like electrodes 12 belonging to the subgroup SG1 in the odd-numbered group driven by the driving circuit D11 in the first driving circuit group 16, while the voltage of the polarity opposite to that applied to the needle-like electrodes 12 is applied to the auxiliary electrodes 141 and 142. As a result, the discharge is started between each of the needle-like electrodes 12 belonging to the subgroup SG1 and the corresponding auxiliary electrodes 141 and 142.

While the voltage is being applied to the auxiliary electrodes 141 and 142 corresponding to the first group G1, the subgroups included in the group G1 are selected in the predetermined order, and the voltages are simultaneously applied to the needle-like electrodes 12 belonging to each of the selected subgroups, so that the needle-like electrodes 12 in the first group G1 operate for the discharge. Then, according to the discharge order described already, the groups, for example, the odd-numbered groups G1, G3, ... are successively driven in the order of starting from the group having the smallest number, and the even-numbered groups G2, G4, ... are then successively driven starting from the group having the smallest number. By executing the above manner of operation for each of the groups, an electrostatic latent image representing one line of an image is formed on the recording sheet.

According to the first embodiment of the method, since the operation for driving the needle-like electrodes belonging to each of the subgroups in one group in the predetermined order and driving the corresponding auxiliary electrodes is executed for each group, the number of the simultaneously driven needle-like electrodes can be decreased. Thus, the difference between the intensity of the electric field produced by the driven needle-like electrodes at the middle part of the subgroup and that produced at the peripheral part of the subgroup can be made smaller than the difference between the intensity of the electric field produced by the driven needle-like electrodes at the middle part of the group and that produced at the peripheral part of the group in the prior art in which one group of the needle-like electrodes is driven at a time. As a result, many striations corresponding to the subgroups tend to appear closely on the recording sheet. However, the degree in contrast of the striations appearing on the recording sheet can be reduced as compared to the case of the prior art electrostatic recording head in which one group of the needle-like electrodes is driven as a unit. Therefore, the undesirable striations appearing on the recording sheet at areas corresponding to the middle part and the peripheral part of each group can be made substantially inconspicuous to the eye.

In FIG. 4 showing the timing of driving the needle-like electrode subgroups relative to the auxiliary electrodes, the corresponding auxiliary electrodes being continuously driven from the time of starting to drive the first one among the subgroups belonging to one group to the time of ending to drive the last one. However, it is apparent that the auxiliary electrodes may only be driven while each of the subgroups is being driven.

Figure 5A:
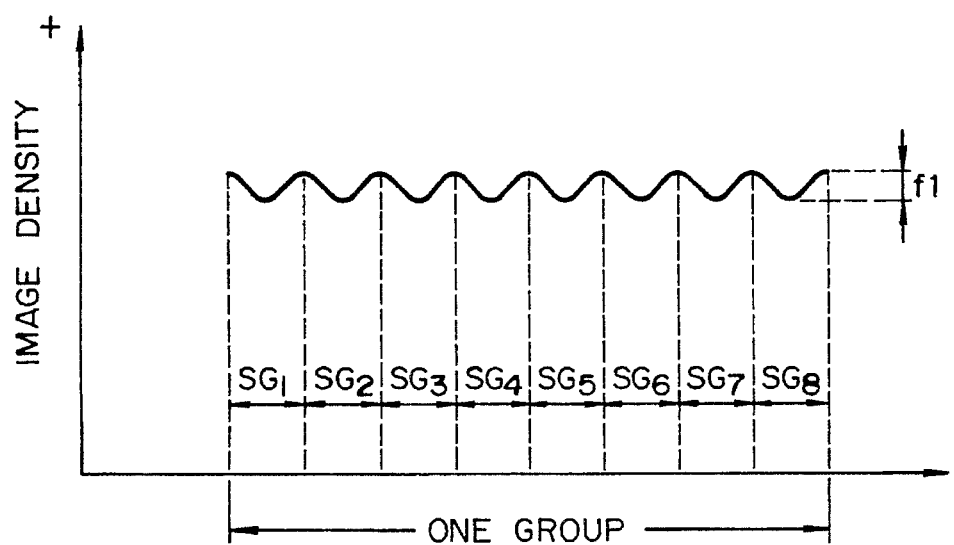
FIG. 5A is a graph showing the distribution of the density of the image formed by the needle-like electrodes of one group when the first embodiment of the driving method of the present invention is used to apply a voltage to all the needle-like electrodes thereby forming a totally black image.
Figure 5B:
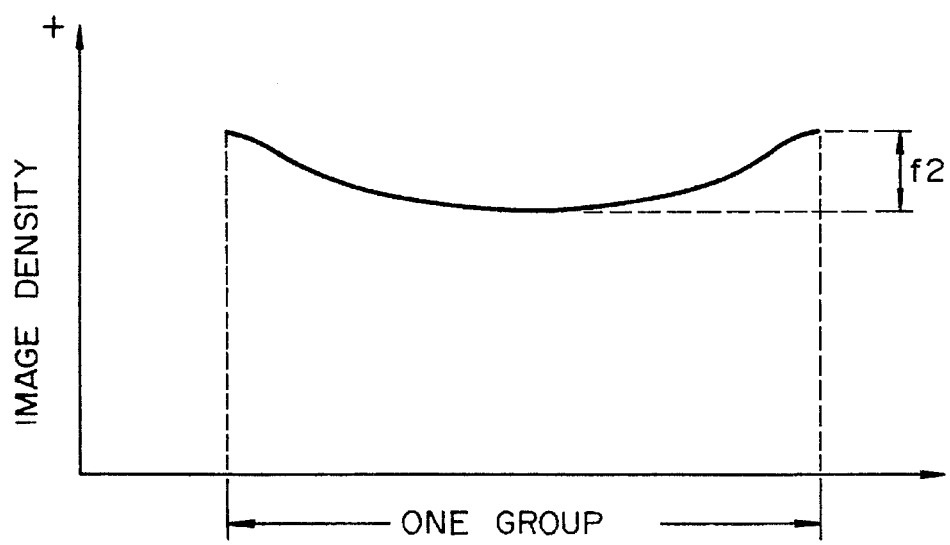
FIG. 5B is a graph showing the distribution of the density of the image formed by the needle-like electrodes of one group when a prior art driving method is used to apply a voltage to all the needle-like electrodes thereby forming a totally black image.

FIG. 5A is a graph showing the image density corresponding to one group when the first embodiment of the method of driving the electrostatic recording head is used to apply the voltage to all the needle-like electrodes to output a totally black image on a recording sheet. FIG. 5B is a graph showing the image density corresponding to one group when the prior art method of driving the electrostatic recording head is used to apply the voltage to all the needle-like electrodes to output a totally black image on a recording sheet. In FIGS. 5A and 5B, the vertical axis represents the image density, and the arrow+indicates the direction in which the image is progressively darkened. The horizontal axis represents the direction of arrangement of the needle-like electrodes. In the case of the prior art method, the equal voltage is applied to the individual needle-like electrodes in one group. However, because the voltage is simultaneously applied to all the needle-like electrodes, the electric field tends to be concentrated more in the neighborhood of the middle part of the group than at the peripheral part of the group due to the spatial arrangement. As a result, the charge density is higher at the peripheral part of the group than at the middle part of the group, and the image density tends to increase at the peripheral part of the group as seen in FIG. 5B. In contrast, in the case of the first embodiment of the present invention method, the difference between the intensity of the electric field produced at the middle part of the subgroup and that produced at the peripheral part of the subgroup can be made smaller than in the prior art. As a result, the difference f1 shown in FIG. 5A between the image density corresponding to the middle part of the subgroup and that corresponding to the peripheral part of the subgroup can be made smaller than the difference f2 shown in FIG. 5B between the image density corresponding to the middle part of the group and that corresponding to the peripheral part the group. Therefore, according to the first embodiment of the method of driving the electrostatic recording head, it is possible to effectively substantially eliminate the adverse effect of appearance of the undesirable striations on the recording sheet.

Further, because the adjacent subgroups are not consecutively driven, the effect of application of the voltage to the needle-like electrodes included in the preceding subgroup is not exerted on the needle-like electrodes included in the next subgroup to which the voltage is to be applied next, so that the first embodiment of the head driving method can further effectively substantially eliminate the adverse effect of appearance of the undesirable striations on the recording sheet.

The method of driving the electrostatic recording head according to the present invention is in no way limited to the first embodiment described above, and various changes and modifications may be made without departing from the subject matter thereof. For example, the individual subgroups need not necessarily be driven in the order described above, and the discharge order may be merely so determined that the plurality of the subgroups may not be simultaneously driven, and the adjacent subgroups may not be consecutively driven, thereby exhibiting the function and effect similar to those of the first embodiment described above.

Further, although the embodiment of the electrostatic recording head according to the present invention has referred to the case where the number of the needle-like electrodes belonging to one group is selected to be 64, and these needle-like electrodes are divided into eight subgroups, the present invention is in no way limited to such a case, and the number of the needle-like electrodes belonging to one group and the number of the subgroups forming one group may be determined as desired according to the use, structure, and the like of the electrostatic recording head.

Further, in the first embodiment of the method, the order of driving the groups is so determined that, after the odd-numbered groups are first driven starting from the group having the smallest number, the even-numbered groups are then driven starting from the group having the smallest number. However, it is apparent that the order of driving the groups is in no way limited to that described above. For example, the odd-numbered groups and the even-numbered groups may be simultaneously driven without simultaneously driving the adjacent groups. Also, the order of driving the groups may be such that the odd-numbered groups are driven successively with a plurality of, for example, two groups at a time and then the even-numbered groups are driven successively with two groups at a time. However, in this case, it is necessary to provide separate driving circuit groups for these two simultaneously driven groups, resulting in complexity of the circuit structure.

The first and second matrix circuits, the first and second driving circuit groups, and the first and second controllers used in the embodiment of the electrostatic recording head of the present invention are based on the same principle as that of and can be constructed to operate in the manner similar to those in the prior art electrostatic recording head. Thus, when data regarding the order of driving the individual groups and the timing of driving the individual subgroups are externally supplied, they operate according to the externally supplied data. Therefore, any detailed description regarding their circuit structures will be unnecessary.

A second embodiment of the present invention will now be described by reference to the drawings. FIG. 6 is a timing chart illustrating the second embodiment of the method of driving an electrostatic recording head. The structure of the electrostatic recording head is similar to that used in the first embodiment of the driving method. Therefore, the structures and the functions of the components of the electrostatic recording head will not be described in detail.

The second embodiment of the present invention method differs from the first embodiment in that the order of discharge of the subgroups is so determined that the needle-like electrodes 12 belonging to the subgroups not adjacent to each other in one group are simultaneously driven. More concretely, as shown in FIG. 6, the order of driving the subgroups is so determined that the subgroups SG2 and SG6 in one group operate first for the discharge, the subgroups SG4 and SG8 operate secondly for the discharge, the subgroups SG1 and SG5 operate thirdly for the discharge, and the subgroups SG3 and SG7 operate finally for the discharge. In this case, the needle-like electrodes 12 belonging to each subgroup are simultaneously driven, and the durations of driving the respective groups of the needle-like electrodes 12 are equal. The remaining steps of the second embodiment of the driving method are similar to those of the first embodiment.

Also in the second embodiment of the method of driving the electrostatic recording head, the subgroups of the needle-like electrodes in one group are driven in the predetermined order, while driving the auxiliary electrodes corresponding to the one group, and such operation is carried out repeatedly for the respective groups, so that, as in the case of the first embodiment of the driving method, the adverse effect of appearance of undesirable striations on a recording sheet can be effectively substantially cancelled. Further, the second embodiment of the driving method, in which the needle-like electrodes belonging to two subgroups not adjacent to each other in one group are simultaneously driven, is advantageous in that, even when there exists, for example, a limitation in the duration of application of the voltage to each group, it is possible to make the duration of driving the needle-like electrodes in each subgroup longer by dividing each group into larger number of subgroups, so that the voltage can be stably applied to the individual needle-like electrodes.

The second embodiment of the method of driving the electrostatic recording head according to the present invention has referred to the case where the needle-like electrodes belonging to the two subgroups not adjacent to each other in one group are simultaneously driven. However, the driving method of the present invention is in no way limited to such a case, and the needle-like electrodes belonging to more than two subgroups not adjacent to each other may be simultaneously driven. For example, FIG. 7 ia a timing chart of a modification of the second embodiment of the present invention method. It will be seen in FIG. 7 that the needle-like electrodes belonging to four subgroups in one group are simultaneously driven. More concretely, the timing of driving the subgroups is determined so that the odd-numbered subgroups SG1, SG3, SG5 and SG7 in one group operate first for the discharge, and the even-numbered subgroups SG2, SG4, SG6 and SG8 operate next for the discharge. In this case too, the effect similar to that obtained by the second embodiment of the driving method can also be obtained.

A third embodiment of the present invention will now be described by reference to the drawings. FIG. 8 is a timing chart illustrating the third embodiment of the method of driving an electrostatic recording head according to the present invention. The electrostatic recording head is similar to that used in the first embodiment of the driving method, and any detailed description regarding the structures and functions of the components will not be given herein.

The third embodiment of method is to eliminate the problem that the density of an image printed on a recording sheet decreases at the position corresponding to the middle part of each group. According to the third embodiment of the method of driving the electrostatic recording head dealing with such a problem, the discharge order of the needle-like electrodes included in the subgroups is so determined that the needle-like electrodes belonging to all the subgroups in one group are simultaneously driven, but the duration of driving every two subgroups of the needle-like electrodes is changed. More concretely, as shown in FIG. 8, the pulse width of the printing pulse signals supplied to the individual driving circuits corresponding to the individual subgroups is so selected that the pulse width for each of the subgroups located at the both ends of one group is shortest, while the pulse width for each of the subgroups located at the middle part of one group is longest. That is, although the needle-like electrodes belonging to the respective subgroups are simultaneously driven, the duration of voltage application is shortest for the subgroups SG1 and SG8, secondly shorter for the subgroups SG2 and SG7, thirdly shorter for the subgroups SG3 and SG6, and longest for the subgroups SG4 and SG5. The remaining steps of the driving method are similar to those of the first embodiment of the driving method.

According to the third embodiment of the method of driving the electrostatic recording head, the needle-like electrodes belonging to all the subgroups in one group are simultaneously driven, but the duration of driving the needle-like electrodes is changed for every two subgroups in the group. Thus, when the density of an image printed on a recording sheet tends to decrease at, for example, the position corresponding to the middle part of each group, the duration of driving the needle-like electrodes belonging to each subgroup is made longer, as the location of the subgroup is closer to the middle part of the group, thereby increasing the density of the part of the image where the density tends to decrease., Thus, non-uniformity of the image density tending to appear on the recording sheet can be effectively substantially cancelled.

The third embodiment of the driving method of the present invention has referred to the case where the density of an image printed on a recording sheet tends to decrease at the position corresponding to the middle part of each group. However, for example, in the case where the density of the image printed on the recording sheet tends to increase at the position corresponding to the middle part of each group, it is preferable that the duration of driving the needle-like electrodes belonging to the subgroups located at the both ends of each group is selected to be longest, and the duration of driving the needle-like electrodes belonging to subgroups located at the middle part of each group is selected to be shortest. Further, although the third embodiment of the driving method of the present invention has referred to the case where the needle-like electrodes belonging to all the subgroups in one group are first simultaneously driven, and the duration of driving the needle-like electrodes belonging to every two subgroups in the group is changed, the needle-like electrodes belonging to all the subgroups in one group need not necessarily be simultaneously driven, and the duration of driving the needle-like electrodes belonging to each subgroup may be changed.

A fourth embodiment of the driving method according to the present invention will now be described by reference to FIG. 9. When the serial numbers 1 to 64 are assigned to the needle-like electrodes in one group, respectively, in an order of left to right, each subgroup is arranged in the aforementioned embodiments to include eight needle-like electrodes having eight continued serial numbers, respectively, such that the first subgroup includes 1-st to 8-th electrodes, the second subgroup includes 9-th to 16-th electrodes and so on. In the fourth embodiment, each subgroup is arranged to include the needle-like electrodes which are dispersedly selected from the 64 needle-like electrodes so that any two of them are not adjacent to each other, such that the first subgroup includes eight needle-like electrodes as numbered by 1-st, 9-th, 17-th, . . . generally represented by (1+8n)-th, where n=0, 1, 2, . . . 7, the second subgroup includes eight needle-like electrodes as numbered by 2-nd, 10-th, 18-th, . . . generally represented by (2+8n)-th, and so on. The other part of the structure of the electrostatic recording head is similar to that of the aforementioned embodiment and any detailed description thereof is omitted.

In the fourth embodiment of the present invention method, the needle-like electrodes in each group are driven in a predetermined order, while the auxiliary electrodes corresponding to that group are driven. This operation is successively applied to the respective groups, thereby forming an electrostatic latent image representing one line of an image on a recording sheet. In this embodiment, the discharge order for the individual groups is so determined that first, the needle-like electrodes in each of, for example, the odd-numbered groups are driven successively in an order of from the one having the smallest number, and then the needle-like electrodes in each of the even-numbered groups are driven successively in an order of from the one having the smallest number.

Further, the discharge order for the needle-like electrodes in each group is so determined that the eight needle-like electrodes not adjacent to one another in one group are simultaneously driven. More concretely, as shown in FIG. 9, the timing of driving the needle-like electrodes is so determined that, in one group, the $(8k+1)$-th $(k=0, 1, 2, \ldots, 7)$ needle-like electrodes are driven first for the discharge, the $(8k+5)$-th $(k=0, 1, 2, \ldots, 7)$ needle-like electrodes are driven secondly for the discharge, the $(8k+3)$-th $(k=0, 1, 2, \ldots, 7)$ needle-like electrodes are driven thirdly for the discharge, the $(8k+7)$-th $(k=0, 1, 2, \ldots, 7)$ needle-like electrodes are driven fourthly for the discharge, the $(8k+2)$-th $(k=0, 1, 2, \ldots, 7)$ needle-like electrodes are driven fifthly for the discharge, the $(8k+6)$-th $(k=0, 1, 2, \ldots, 7)$ needle-like electrodes are driven sixthly for the discharge, the $(8k+4)$-th $(k=0, 1, 2, \ldots, 7)$ needle-like electrodes are driven seventhly for the discharge, and the $(8k+8)$-th $(k=0, 1, 2, \ldots, 7)$ needle-like electrodes are driven finally for the discharge. In this fourth embodiment of the driving method, the duration of driving each needle-like electrode is constant.

Also in the fourth embodiment of the method of driving the electrostatic recording head, the needle-like electrodes (the subgroups) in one group are individually driven in a predetermined order, while the auxiliary electrodes corresponding to that group are driven. This operation is successively applied to the respective groups, so that, as in the case of the first embodiment of the driving method, appearance of undesirable striations on a recording sheet can be substantially effectively cancelled. Further, in the fourth embodiment of the driving method, one needle-like electrode constitutes each subgroup, and the timing of driving the individual needle-like electrodes is suitably changed, so that appearance of the undesirable striations on a recording sheet due to, for example, the edge effect of the electric field can be further effectively minimized.

It is apparent that the present invention is in no way limited to the embodiments described above, and various changes and modifications may be made without departing from the subject matter thereof. For example, although the embodiments described above have referred to the case where the individual groups of the needle-like electrodes and the associated auxiliary electrodes are disposed in such a relation that they are displaced by the half of their lengths from each other, each of the individual groups of the needle-like electrodes may be disposed to face one of the auxiliary electrodes without displacing each group relative to the auxiliary electrodes.

It will be understood from the foregoing description that, although, according to the invention, many striations corresponding to the subgroups tend to appear closely on a recording medium when the needle-like electrode driving means and the auxiliary electrode driving means are controlled so as to drive the needle-like electrodes belonging to each subgroup in one group in a predetermined order and to drive the auxiliary electrodes corresponding to that group, the striations tending to appear on the recording medium at areas corresponding to the middle part and the peripheral part of each group can be made substantially non-conspicuous to the eye. Therefore, the present invention can provide an electrostatic recording head that is capable of substantially effectively cancelling undesirable striations tending to appear on a recording medium.

It will be understood from the foregoing description that, although, according to another embodiment of the invention, many striations corresponding to the subgroups tend to appear closely on a recording medium when the operation for driving the needle-like electrodes belonging to each subgroup in one group in a predetermined order and driving the auxiliary electrodes corresponding to that group is carried out for each group, the striations tending to appear on the recording medium at areas corresponding to the middle part and the peripheral part of the group can be made substantially non-conspicuous to the eye. Therefore, the present invention can provide a method of driving an electrostatic recording head that is capable of substantially effectively cancelling undesirable striations tending to appear on a recording medium.

Further, in one driving mode according to the present invention, the needle-like electrodes belonging to a plurality of subgroups not adjacent to each other in one group are simultaneously driven, so that the duration of driving the needle-like electrodes belonging to each subgroup can be increased even when one group is divided into a larger number of subgroups in spite of a limitation in, for example, the duration of voltage application to each subgroup. Therefore, the present invention can provide a method of driving an electrostatic recording head in which the voltage can be stably applied to the individual needle-like electrodes.

Further, in another driving mode according to the present invention, the duration of driving the needle-like electrodes belonging to different subgroups in one group is changed, so that, when the density of an image recorded on a recording medium at the position corresponding to, for example, the middle part of each group tends to decrease, the subgroups located nearer to the middle part of the group are driven for a longer duration, thereby increasing the density at the position where the image density tends to decrease. Therefore, the present invention can provide a method of driving an electrostatic recording head in which non-uniformity of the image density on a recording medium can be substantially effectively cancelled.

According to another aspect of the present invention, only one needle-like electrode constitutes each of the subgroups. Therefore, the present invention can provide an electrostatic recording head and a method of driving the same, in which striations tending to appear on a recording medium due to, for example, the edge effect of the electric field can be substantially effectively cancelled.

We claim:

1. An electrostatic recording head used for forming an electrostatic latent image of an image to be recorded on a recording medium, comprising:

a plurality of electrode groups, each group including a plurality of needle-like electrodes, the needle-like electrodes of all the groups being arranged linearly in at least one line;

a plurality of auxiliary electrodes disposed such that each of said electrode groups faces at least one of the auxiliary electrodes;

auxiliary electrode driving means for driving said auxiliary electrodes independently of each other;

a plurality of subgroups, into which each of said electrode groups is divided, each subgroup including at least one of said needle-like electrodes;

subgroup diving means provided for each of said subgroups for driving said subgroups independently of each other; and control means for controlling said subgroup driving means and said auxiliary electrode driving means so that the subgroups belonging to one of the electrode groups are driven in such an order that a plurality of subgroups which are not adjacent to each other are simultaneously driven, while at least one of the auxiliary electrodes facing the one electrode group is driven during at least a time interval when any one of the subgroups is driven.

2. An electrostatic recording head according to claim 1, wherein each of said subgroups includes at least one needle-like electrode.

3. An electrostatic recording head according to claim 2, wherein each of said subgroups includes one needle-like electrode.

4. A method of driving an electrostatic recording head including linear arrangement of a multiplicity of needle-like electrodes, said method comprising the steps of:

dividing said multiplicity of needle-like electrodes into a plurality of electrode groups, each electrode group including a plurality of the needle-like electrodes;

providing at least one auxiliary electrode facing each of said plurality of electrode groups;

dividing each of said electrode groups into a plurality of subgroups, each subgroup including at least one of the needle-like electrodes; and successively driving said plurality of subgroups belonging to one of said plurality of electrode groups in such an order that a plurality of subgroups which are not adjacent to each other are simultaneously driven, while driving said at least one auxiliary electrode facing said one electrode group during at least a time interval when any one of said subgroups is driven.

5. An electrostatic recording head used for forming an electrostatic latent image of an image to be recorded on a recording medium comprising:

a plurality of electrode groups, each electrode group including a plurality of needle-like electrodes, the needle-like electrodes of all the electrode groups being arranged linearly in at least one line;

a plurality of auxiliary electrodes disposed such that each of said electrode groups faces at least one of the auxiliary electrodes;

auxiliary electrode driving means for driving said auxiliary electrodes independently of each other;

a plurality of electrode subgroups, into which each of said electrode groups is divided, each subgroup including at least one of said needle-like electrodes;

subgroup driving means provided for each of said subgroups, and for driving said subgroups independently of each other; and control means for controlling said subgroup driving means and said auxiliary electrode driving means so that said plurality of subgroups in one of said electrode groups are driven for different time intervals, respectively, while at least one of the auxiliary electrodes facing the one electrode group is driven during at least a time interval when any one of the subgroups is driven.

6. An electrostatic recording head used for forming an electrostatic latent image of an image to be recorded on a recording medium comprising:

a plurality of electrode groups, each group including a plurality of needle-like electrodes, the needle-like electrodes of all the groups being arranged linearly in at least one line;

a plurality of auxiliary electrodes disposed such that each of said electrode groups faces at least one of the auxiliary electrodes;

auxiliary electrode driving means for driving said auxiliary electrodes independently of each other;

a plurality of subgroups, into which each of said electrode groups is divided, each subgroup including the needle-like electrodes which are disposed dispersedly in an associated electrode group so that any two of the needle-like electrodes included in each of said subgroups are not adjacent to each other in the linear arrangement of said needle-like electrodes;

subgroup driving means provided for each of said subgroups, for driving said subgroups independently of each other; and control means for controlling said subgroup driving means and said auxiliary electrode driving means so that the subgroups belonging to one of the electrode groups are driven in a predetermined order, while at least one of the auxiliary electrodes facing the one electrode group is driven during at least a time interval when any one of the subgroups is driven.

7. A method of driving an electrostatic recording head including linear arrangement of a multiplicity of needle-like electrodes, said method comprising the steps of:

dividing said multiplicity of needle-like electrodes into a plurality of electrode groups, each electrode group including a plurality of the needle-like electrodes;

providing at least one auxiliary electrode to face each of said plurality of electrode groups;

dividing each of said electrode groups into a plurality of subgroups, each subgroup including at least one of the needle-like electrodes; and driving said plurality of subgroups belonging to one of said plurality of electrode groups for different time intervals, respectively, while driving said at least one auxiliary electrode facing said one electrode group during at least a time interval when any one of said subgroups is driven.

8. A method of driving an electrostatic recording head including linear arrangement of a multiplicity of needle-like electrodes, said method comprising the steps of:

dividing said multiplicity of needle-like electrodes into a plurality of electrode groups, each including a plurality of the needle-like electrodes;

providing at least one auxiliary electrode to face each of said plurality of electrode groups;

dividing each of said electrode groups into a plurality of subgroups, each subgroup including the needle-like electrodes which are disposed dispersedly in the electrode group so that any two of the needle-like electrodes included in each of said subgroups are not adjacent to each other in the linear arrangement of said needle-like electrodes; and successively driving said plurality of subgroups belonging to one of said plurality of electrode groups in a predetermined order, while driving said at least one auxiliary electrode facing said one electrode group during at least a time interval when any one of said subgroups if driven.

* * * * *

UNITED STATES PATENT AND TRADEMARK OFFICE
CERTIFICATE OF CORRECTION

PATENT NO. :   5,515,095
DATED      :   May 7, 1996
INVENTOR(S):   Naoya Matsuda and Tetsuo Itagaki It is certified that error appears in the above-identified patent and that said Letters Patent is hereby corrected as shown below:

Column 14, line 63, change "diving" to -- driving --;

Column 16, line 63, change "if" to -- is --.

Signed and Sealed this

Third Day of December, 1996

Attest:

BRUCE LEHMAN

Attesting Officer

Commissioner of Patents and Trademarks